United States Patent [19]
Yoshida et al.

[11] Patent Number: 6,126,730
[45] Date of Patent: Oct. 3, 2000

[54] COATING COMPOSITION AND RESIN-COATED METAL SHEETS

[75] Inventors: Tsutomu Yoshida, Amagasaki; Kenji Ikishima, Kobe; Kiyoyuki Fukui, Takatsuki; Masamitsu Matsumoto, Nishinomiya; Yozo Hirose, Osaka; Tadashi Sakane, Amagasaki; Toshiharu Oshiba, Itami, all of Japan

[73] Assignee: Sumitomo Metal Industries, Ltd., Osaka, Japan

[21] Appl. No.: 09/105,156

[22] Filed: Jun. 26, 1998

Related U.S. Application Data

[63] Continuation of application No. PCT/JP97/03919, Oct. 29, 1997.

[30] Foreign Application Priority Data

Oct. 29, 1996 [JP] Japan ................................... 8-286927

[51] Int. Cl.$^7$ ................................ C09D 5/24; B05D 7/16
[52] U.S. Cl. .................................. 106/14.41; 106/14.42; 106/14.44; 252/518.1; 252/519.33; 252/521.2; 428/457; 428/458; 428/469; 428/472.2; 428/472.3; 524/435
[58] Field of Search .............................. 106/14.44, 14.41, 106/14.42; 252/518.1, 519.33, 521.2; 428/457, 458, 469, 472.2, 472.3; 524/435

[56] References Cited

U.S. PATENT DOCUMENTS

| | | | |
|---|---|---|---|
| 4,719,038 | 1/1988 | Sobata et al. | 252/511 |
| 4,853,285 | 8/1989 | Sobata et al. | 428/336 |
| 4,939,034 | 7/1990 | Sobata et al. | 428/336 |
| 4,994,121 | 2/1991 | Sobata et al. | 148/251 |
| 5,260,120 | 11/1993 | Moyle et al. | 428/219 |
| 5,580,371 | 12/1996 | Falberg | 106/14.12 |

FOREIGN PATENT DOCUMENTS

| | | |
|---|---|---|
| 59-11247 | 1/1984 | Japan . |
| 60-203677 | 10/1985 | Japan . |
| 3-76828 | 12/1991 | Japan . |
| 5-305450 | 11/1993 | Japan . |
| 6-155658 | 6/1994 | Japan . |
| 11-5269 | 1/1999 | Japan . |

OTHER PUBLICATIONS

Derwent Abstract No. 1997–497975, abstract of Japanese Patent Specification No. 09–234820 (Sep. 1997).
Chemical Abstract No. 122:192181, abstract of Japanese Patent Specification No. 06–330064 (Nov. 1994).
Chemical Abstract No. 127:347693, abstract of Japanese Patent Specification No. 09–276788 (Oct. 1997).
Chemical Abstract No. 128:205992, abstract of Japanese Patent Specification No. 10–043677 (Feb. 1998).
Chemical Abstract No. 130:111624, abstract of Japanese Patent Specification No. 11–5269 (Jan. 1999).

*Primary Examiner*—Anthony Green
*Attorney, Agent, or Firm*—Burns, Doane, Swecker & Mathis, LLP

[57] ABSTRACT

A coating composition comprising 38%–66% of a binder resin (including a curing agent), 0.2%–6% of an organic lubricant, 20%–50% of an iron phosphide-based electrically conductive pigment, and 3%–25% of one or more other inorganic pigments including anticorrosive pigments (the total content of these pigments being between 31% and 56%), wherein the content of the binder resin (including a curing agent) (R) and that of the organic lubricant (W) satisfy the following inequality:

$$-0.4R+16.2 \leq W \leq -0.4R+30.4, \text{ and}$$

wherein the coating composition further comprises a curing catalyst in an amount of from 0.7% to 10% based on the solids of the binder resin (including a curing agent). The coating composition can be applied to a plated metal sheet having a zinc- or aluminum-based plated coating after the plated metal sheet has been subjected to chemical conversion treatment such as chromating treatment, to form a resinous coating thereon having a thickness of 2–9 μm, thereby resulting in the production of a resin-coated metal sheet having improved overcoat adhesion, weldability, edge face corrosion resistance, and formability, which is suitable for use as a material for automotive repair parts.

8 Claims, 2 Drawing Sheets

COATING COMPOSITION AND RESIN-COATED METAL SHEETS

This application is a continuation of application Ser. No. PCT/JP97/03919, filed Oct. 29, 1997.

TECHNICAL FIELD

This invention relates to a coating composition capable of forming a resinous coating having improved overcoatability (adhesion to an overcoat), weldability, corrosion resistance of an edge face, and formability (press formability), as well as resin-coated metal sheets having a coated film of the coating composition thereon, the sheets being suitable for use, e.g., as a material of automotive repair parts.

BACKGROUND ART

Resin-coated metal plates or sheets, to which a resinous coating has been applied before delivery to users, can be roughly divided into two types: those designed for use without a top coating after forming so that the resinous coating can form the exterior of a product as such (hereinafter referred to as "precoated metal sheets"), and those designed for use with application of a top coating after press forming (hereinafter referred to as "preprimed metal sheets").

Precoated metal sheets having a topcoat layer, which make it totally unnecessary for users to perform a coating process, have been widely employed in the production of appliances and outdoor utensils and instruments. However, their use in automobiles has been limited, mainly for the reason that conventional precoated metal sheets have little or no electrical conductivity and cannot be bonded by welding, which is widely employed in assembling automobiles.

Automobile makers also greatly desire a simplified coating process. For this purpose, the following two approaches are conceivable. One is the use of precoated metal sheets (mainly steel sheets) to eliminate the entire coating process, and the other is the use of preprimed metal sheets to eliminate part of the coating process (electrocoating step, or electrocoating and intermediate coating steps of the coating process). The use of preprimed metal sheets, which can be put into practical use more easily than precoated metal sheets, will be realized initially in the automotive industry.

Among automotive parts to which prepriming can be applied, repair parts are considered to be most easily preprimed since they are coated individually and are composed solely of metal sheets (without using thick metal plates). On the other hand, prepriming of entire automotive bodies involves many problems, since application of prepriming thereto may require a change of bonding method and involves prepriming of small parts made of thick metal plates. Even for automotive repair parts, use of preprimed metal sheets has the merit of economy since it eliminates an electrocoating step or electrocoating and intermediate coating steps.

Many attempts have been made to develop resin-coated metal sheets, particularly resin-coated steel sheets, having various properties required for automotive materials, such as formability, corrosion resistance, and weldability. Regarding weldability, spot-weldable, resin-coated steel sheets have been developed in which spot weldability is afforded either by adding an electrically conductive pigment to the coated film or by reducing the thickness of the coated film by an extreme amount. Most of the resin-coated steel sheets which have been employed in automobiles are those comprising a base sheet of a plated steel sheet with a zinc- or aluminum-based plated coating, having thereon a lower chromate coating and an upper extremely thin organic resinous coating having a thickness on the order of 1 $\mu$m (see, e.g., Japanese Patent Application Laid-Open No. 6-155658). These resin-coated steel sheets having a thin resinous coating, which may be called "organic-inorganic composite coated steel sheets", can be processed by welding or electrocoating while maintaining good corrosion resistance.

However, the good corrosion resistance of such a composite coated steel sheet indicates that corrosion resistance to pitting in a flat plane portion of the sheet before or after top coating is good, e.g., to a degree sufficient to guarantee prevention of pitting for ten years. On the other hand, precoated steel sheets are required to have corrosion resistance even on cut edge faces and punched edge faces (hereinafter referred to as "edge face corrosion resistance"), which is totally different from corrosion resistance to pitting on a flat plane.

Therefore, use of composite coated steel sheets having a thin resinous coating to fabricate automotive repair parts involves problems on the edge faces thereof. This is because conventional composite coated steel sheets have a very thin resinous coating with a thickness on the order of 1 $\mu$m, which is insufficient for adequate protection of edge faces. Application of intermediate and top coating cannot cover the edge faces completely.

Accordingly, conventional composite coated steel sheets, even if intermediate and top coating is applied thereto without initial electrodeposition coating, do not have a sufficient level of edge face corrosion resistance. For this reason, they are considered to be highly corrosion-resistant steel sheets having corrosion resistance superior to plated steel sheets, and are mainly used as a steel sheet material for bodies of luxury cars by application of the entire coating process including electrodeposition coating, which does not lead to simplification of the coating process.

Automotive repair parts are coated with a repair paint for topcoating. Unlike the high-temperature curing coating compositions that are normally used in automotive fabrication, repair paint is a low-temperature curing coating composition usually baked at a temperature of from about 50° C. to about 80° C.

It is difficult for conventional composite coated steel sheets to achieve good adhesion to a coat formed from low-temperature curing repair paint.

The resin-coated metal sheets disclosed in Japanese Patent No. 1,711,387, for example, are not satisfactory with respect to edge face corrosion resistance and adhesion to low-temperature curing repair paint coating, although they possess good weldability, formability, and corrosion resistance on a flat plane.

DISCLOSURE OF INVENTION

It is an object of the present invention to provide a coating composition capable of forming a resinous coating having good weldability (by continuous spot welding), edge face corrosion resistance, and formability, and capable of being overcoated with a low-temperature curing coating composition with good adhesion.

Another object of the present invention is to provide a resin-coated metal sheet which has a resinous coating formed from the coating composition described above and which is suitable for use as a material for automotive repair parts.

The present inventors performed investigations seeking a measure for providing a weldable resin-coated metal sheet (which has a resinous coating containing an electrically-conductive pigment) with satisfactory edge face corrosion resistance by improving its adhesion to a low-temperature curing coating composition used as a repair paint for top-coating (such adhesion being hereinafter referred to as overcoat adhesion), and found that optimization of the contents of a resin, organic lubricant, electrically-conductive pigment, and other inorganic pigments (non-conductive pigments) present in the coating composition in combination with addition of an appropriate amount of a curing catalyst thereto results in well-balanced improvement in edge face corrosion resistance, overcoat adhesion, weldability, and formability.

For example, edge face corrosion resistance of a resin-coated metal sheet is most influenced by the adhesion of the resinous coating thereof. An increased content of a resin component in the coating contributes to improvement in adhesion, and addition of one or more other (non-conductive) pigments results in improvement in strength of the coating, thereby improving the edge face corrosion resistance of the resin-coated metal sheet.

Overcoat adhesion of a resin-coated metal sheet is affected by wettability of the resinous coating thereof. The presence of an organic lubricant and iron phosphide as an electrically conductive pigment in increased amounts in the resinous coating causes the resinous coating to have a decreased wettability and hence a decreased overcoat adhesion.

The denseness of the superficial stratum (outermost skin) of the resinous coating also influences the overcoat adhesion. If the superficial stratum of a resinous coating is in a loose state, the surface of the coating will be swollen, during overcoating, by an organic solvent (thinner) present in the coating composition used for topcoating, thereby weakening the coating and causing peeling of the resulting topcoat film originating at the weakened superficial stratum.

Thus, in order to provide the resinous coating with satisfactory overcoat adhesion, the wettability on the surface of the resinous coating should properly be controlled, and the superficial stratum of the coating should be densified by increasing the crosslink density of that stratum. To do so, addition of an appropriate amount of a curing catalyst to the coating is effective, thereby significantly improving the overcoat adhesion of the resinous coating.

In order to provide the resinous coating with improved formability (press formability), optimization of the resin content and pigment content in the coating is important. A decrease in the resin content or an increase in the content of iron phosphide as an electrically conductive pigment may cause powdering during press forming. The addition of an appropriate amount of a curing catalyst is also effective for prevention of powdering since it serves to improve the binding power between the resin and the pigment.

The presence of an organic lubricant in an increased amount in the resinous coating decreases its coefficient of dynamic friction. However, if the coefficient of dynamic friction is too low, wrinkling may occur during press forming. In particular, a material for automotive repair parts is subjected to press forming after a wash oil has been applied thereto. Therefore, its coefficient of dynamic friction should be controlled to a higher value compared to a conventional non-weldable precoat metal sheet, which was assumed to be formed by oil-free press forming.

On the basis of the above-described viewpoints, a resin-coated metal sheet having well-balanced properties (with respect to overcoat adhesion, weldability, edge face corrosion resistance, and formability) can be obtained by minimizing the contents of iron phosphide and organic lubricant in the resinous coating, increasing the resin content, adding an appropriate amount of other inorganic pigment to strengthen the coating, and adding a curing catalyst to make the superficial stratum of the resinous coating dense.

The present invention has been accomplished based on the above-described knowledge and provides the following coating composition (1) and resin-coated metal sheet (2).

(1) A coating composition comprising the following ingredients in a solvent, on a weight basis as solids content:

at least 38% and not greater than 66% of a binder resin (including a curing agent), at least 0.2% and not greater than 6% of an organic lubricant, at least 20% and not greater than 50% of an iron phosphide-based electrically conductive pigment, and at least 3% and not greater than 25% of one or more inorganic pigments other than the electrically conductive pigment, wherein the sum of the contents of the electrically conductive pigment and other inorganic pigments is at least 31% and not greater than 56%, and wherein the contents of the binder resin (including a curing agent) and the organic lubricant satisfy the inequality:

$$-0.4R+16.2 \leq W \leq -0.4R+30.4 \qquad (I),$$

where R: content in weight percent of the binder resin including a curing agent, and W: content in weight percent of the organic lubricant, the coating composition further comprising a curing catalyst in an amount of at least 0.7% and not greater than 10% by weight based on the solids of the binder resin (including a curing agent).

(2) A resin-coated metal sheet comprising a plated metal sheet with a zinc- or aluminum-based plated coating, the resin-coated metal sheet having thereon a lower coating formed by at least one class of chemical conversion treatment selected from zinc phosphate treatment and chromate treatment, and an upper resinous coating formed from the coating composition (1) which has a thickness in the range of from 2 $\mu$m to 9 $\mu$m.

BEST MODE FOR CARRYING OUT THE INVENTION

Now the present invention will be described in detail. In the following description, all percents are by weight unless otherwise indicated.

The coating composition according to the present invention contains prescribed amounts of a binder resin (including a curing agent), a curing catalyst, an organic lubricant, and pigments (an electrically conductive pigment plus one or more other inorganic pigments) in a solvent. Since the curing catalyst is normally available in solution, its content given herein indicates an amount as the effective ingredient. The binder resin may be either dissolved or dispersed in the solvent, as described below.

The contents of the above-described components other than the curing catalyst are on a solids basis, i.e., contents as solids (or as effective ingredient) based on the total solids content of the coating composition from which volatiles are excluded. The content of the curing catalyst is its amount as solids (or as effective ingredient) based on the solids content of the binder resin (including a curing agent). A resinous coating formed by application of the coating composition followed by drying is substantially freed of any volatiles and has a composition which is substantially the same as that of the coating composition on a solids basis.

Binder Resin (Base Resin+Curing Agent)

The binder resin present in the coating composition according to the present invention generally consists of a base resin and a curing agent. It is possible to use the curing agent alone as the binder resin, but such a case is rare because the formability and adhesion of the resulting resinous coating tend to become insufficient.

The base resin constituting the binder resin is not critical and may be any resin which can be used ordinarily in precoat steel sheets. With the object of forming a resin-coated metal sheet which achieves well-balanced improvement with respect to overcoat adhesion, edge face corrosion resistance, formability, and weldability, the base resin is preferably selected from a polyester resin, an epoxy resin, a urethane resin, and an acrylic resin. Modified resins derived from these resins may also be employed as a base resin. The modified resins include those obtained by cold blend of two or more different resins and those obtained by terminal modification whereby a first resin is reacted at its end with a second resin. The base resin may comprise two or more resins as long as they are compatible with each other.

The curing agent is not critical and may be any curing agent which can be used ordinarily in precoat steel sheets. Examples of such curing agents include amines, acid anhydrides, and phenolic resins. Particularly preferred curing agents include alkyletherified amino-formaldehyde resins (e.g., alkyletherified melamine resins) and isocyanate compounds. Two or more classes of curing agents may be used with a base resin.

The above-described base resin and curing agent may be either dissolved in an organic solvent or emulsified in an aqueous medium.

The content of the binder resin (the sum of the base resin and curing agent) in the coating composition (on a solids basis, as described above) is at least 38% and not greater than 66% as solids. With a content of less than 38%, the resulting resinous coating may not have sufficient adhesion to the base metal sheet and may tend to cause powdering during press forming. In addition, the edge face corrosion resistance may be deteriorated. If the coating composition contains more than 66% of the binder resin, the weldability will be significantly deteriorated. The content of the binder resin is preferably at least 42% and not greater than 62% and more preferably at least 46% and not greater than 58%.

Curing Catalyst

The curing catalyst may be selected based on the particular curing agent used in the binder resin. For example, when an alkyletherified amino-formaldehyde resin is used as a curing agent, the curing catalyst may be selected from sulfonic acids such as para-toluenesulfonic acid and dodecylbenzenesulfonic acid. These acid catalysts may be used either as such (without neutralization) or after neutralization with a base such as an amine.

When the curing agent is an isocyanate compound, metal salts of an organic acid such as dibutyltin dilaurate and 1,3-diacetoxy-tetrabutylstannoxane, and tertiary amines and their salts such as triethylene diamine and tetrabutylammonium chloride can be used as a curing catalyst.

The curing catalyst is added in such an amount that the content of the active ingredient present therein is at least 0.7% and not greater than 10% based on the binder resin (base resin plus curing agent), i.e., from 0.7 to 10 PHR (Per Hundred Resin). If the content of the curing catalyst is less than 0.7%, a dense superficial stratum will not be formed on the surface of the resulting resinous coating, thereby adversely affecting the overcoat adhesion. If its content exceeds 10%, curing will proceed excessively, thereby adversely affecting formability and weldability. The storage stability of the coating composition will also become worse. The amount of the curing catalyst added is preferably at least 1.5% and not greater than 8% and more preferably at least 2% and not greater than 7%.

Organic Lubricant

The organic lubricant serves to reduce the friction between a jig used for press forming and the resinous coating and hence reduce the stress applied to the coating in order to prevent damage to the coating which may occur during press forming. Preferably the organic lubricant is of a low specific gravity so as to occupy an increased volume fraction in the resinous coating. It is also preferred that the organic lubricant be susceptible to thermal decomposition by the heat applied during welding and be able to accelerate thermal decomposition of the resin present in the resinous coating.

Examples of organic lubricants which possess the above-described properties include polyolefins such as polyethylenes and polypropylenes, carboxylate esters, and polyalkylene glycols. The carboxylate esters include monoesters, diesters, and polyesters of a carboxylic acid such as stearic acid, oleic acid, adipic acid, or sebacic acid with an alcohol such as n-butanol, sec-butanol, or neopentyl alcohol. The polyalkylene glycols include polypropylene glycols and polyethylene glycols. One or more of these organic lubricants may be used.

The organic lubricant preferably has an average particle diameter of at least 1 $\mu$m and not greater than 10 $\mu$m. With an average diameter of less than 1 $\mu$m, it is difficult for the organic lubricant to develop sufficient lubricity. When the organic lubricant has an average diameter of greater than 10 $\mu$m, it tends to drop off from the coating during press forming and may cause the formation of indentation defects. The average particle diameter of the organic lubricant is more preferably between 3 $\mu$m and 8 $\mu$m.

The organic lubricant is present in the coating composition in an amount of at least 0.2% and not greater than 6%. If the content of the organic lubricant is less than 0.2%, formability will not be improved sufficiently and powdering or peeling of the coating may occur particularly in such cases where a wash oil is not applied thoroughly. Furthermore, a great difference in lubricating quality between areas covered and uncovered with the wash oil may result in the occurrence of wrinkling of the press-formed sheet. On the other hand, the presence of the organic lubricant in excess of 6% results in the formation of a coating having an excessively small coefficient of dynamic friction, which may tend to be wrinkled during press forming or cause indentation defects by the lubricant particles which have dropped off from the coating, and it also adversely affects the overcoat adhesion. The content of the organic lubricant is preferably at least 0.5% and not greater than 5% and more preferably at least 0.7% and not greater than 4%.

The content of the binder resin (R) and the content of organic lubricant (W) both in weight percent should satisfy the following inequality (I), in addition to the inequalities: $38 \leq R \leq 66$ and $0.2 \leq W < 6$, as stated above:

$$-0.4R+16.2 \leq W \leq -0.4R+30.4 \quad (I).$$

Inequality (I) was deduced from our investigation on the relationship between the content of the organic lubricant and the binder resin required to maintain good formability of a resinous coating formed from the coating composition. Inequality (I) indicates that the amount of the organic lubricant added may be decreased with increasing amounts of the binder resin. This is because the binder resin itself has lubricating properties to some extent. As a result, the presence of a relatively large amount of the binder resin provides the resulting coating with good adhesion to the base metal sheet, and good formability is achieved even if the content of the organic lubricant is relatively low. Conversely, in the case where the amount of the binder resin is relatively small, the organic lubricant should be added in an increased amount.

Figure 1:
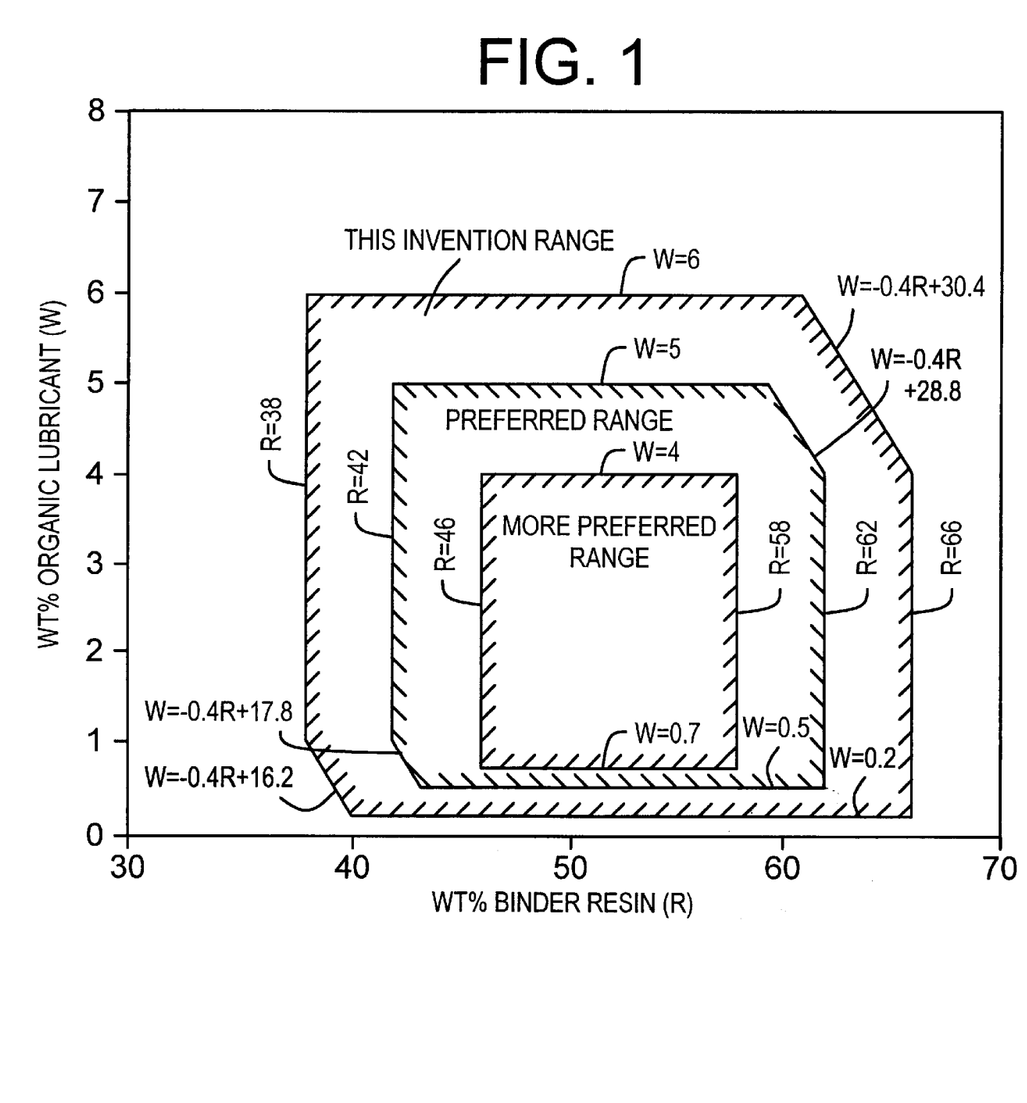
FIG. 1 is a diagram showing the appropriate ranges of the contents of the binder resin and organic lubricant in the coating composition according to the present invention.

The relationship between the contents of the binder resin (R) and the organic lubricant (W) according to the above Inequality (I) is depicted in FIG. 1 by the outermost hatched box (marked "This Invention Range"). A preferred range for Inequality (I) is expressed by the following Inequality (II) with preferred ranges for R and W (in weight percent) being $4223 R \leq 62$ and $0.5 \leq W \leq 5$, respectively, as stated above:

$$-0.4R+17.8 \leq W \leq -0.4R+28.8 \quad (II).$$

The preferred range for the relationship between the contents of the binder resin (R) and the organic lubricant (W) which satisfies these preferred inequalities is depicted in FIG. 1 by the intermediate box (marked "Preferred Range").

A more preferred range for R and W in weight percent is defined by $46 \leq R \leq 58$ and $0.7 \leq W \leq 4$ and depicted in FIG. 1 by the innermost box (marked "More Preferred Range"). Electrically Conductive Pigment The coating composition according to the present invention contains an electrically conductive pigment in order to provide the resulting resinous coating with electrical conductivity sufficient for welding. It is preferable to use an electrically conductive pigment which possesses (a) a low and stable resistivity such that addition of a small amount of the pigment produces sufficient passage of electrical current, (b) a high melting point so as not to fuse by the heat applied during welding, (c) a high hardness such that the conductive pigment breaks through the resinous coating, which is insulating, by the pressure applied during welding to maintain good electrical contact, and (d) capability of being mass produced with low costs.

The most preferable conductive pigment which meets these conditions is a pigment based on iron phosphide ($Fe_2P$) and having an average particle diameter of not greater than 20 $\mu$m and preferably not greater than 10 $\mu$m. Various iron phosphide-based conductive pigments are commercially available, for example, under the tradename Ferrophos, and one or more of these may be used.

The iron phosphide-based conductive pigment is present in the coating composition in an amount of at least 20% and not greater than 50%. A content of the conductive pigment of less than 20% does not provide the resinous coating with sufficient weldability, while the presence of the conductive pigment in an amount of greater than 50% does not produce further improvement in weldability and has adverse effects on formability, overcoat adhesion, and edge face corrosion resistance. Preferably the conductive pigment is present in an amount of at least 25% and not greater than 45%.

Other Inorganic Pigment

The coating composition according to the present invention contains one or more "other inorganic pigments" in addition to an electrically conductive pigment, in order to improve the edge face corrosion resistance and water-resisting adhesion of the resulting resin-coated metal sheets coated with the composition.

The "other inorganic pigments" include an anticorrosive pigment (capable of providing the resulting resinous coating with rust-preventing properties) and a body pigment. The anticorrosive pigment includes a chromate-type anticorrosive pigment which produces improved edge face corrosion resistance by elution of hexavalent chromium and a non-chromium anticorrosive pigment which is free from chromium.

Examples of the chromate-type anticorrosive pigment include zinc chromate, strontium chromate, calcium chromate, barium chromate, and basic lead chromate. The chromate-type anticorrosive pigment also serves to prevent decomposition of iron phosphide.

The non-chromium or chromium-free anticorrosive pigment includes a phosphate pigment, a vanadate pigment, a molybdate pigment, and a phosphomolybdate pigment. Specific examples of these pigments include zinc phosphate, calcium phosphate, magnesium phosphate/vanadium pentoxide mixture, zinc molybdate, strontium molybdate, and aluminum phosphomolybdate.

Examples of the body pigment include silica, alumina, kaolin, calcium carbonate, barium sulfate, titanium oxide, carbon black, and iron oxide.

One or more of these other inorganic pigments may be used. When two or more of these pigments are used in combination, it is preferable to combine one or more chromate-type or non-chromium anticorrosive pigments with one or more body pigments, although a combination of two or more anticorrosive pigments with no body pigment, or a combination of two or more body pigments with no anticorrosive pigment, may be employed.

The one or more other inorganic pigments (which include the anticorrosive pigment) are present in the coating composition such that the total amount thereof is not greater than 25%. The addition of the other inorganic pigments in a total amount exceeding 25% adversely affects weldability. When the other inorganic pigments contain the chromate-type or non-chromium anticorrosive pigment, the total amount of the other inorganic pigments which include the anticorrosive pigment is preferably at least 3%. The content of the chromate-type anticorrosive pigment is preferably not greater than 11%. The presence of such an anticorrosive pigment in excess of 11% not only adversely affects formability but also may produces a problem due to chromium elution. When the other inorganic pigments do not contain any anticorrosive pigment and consist solely of a body pigment or pigments, the content thereof is preferably at least 10%.

The total content of the inorganic pigments as a whole (the sum of the contents of the conductive and other inorganic pigments) is at least 31% and not greater than 56%. If the total content of the inorganic pigments is less than 31%, either the weldability or edge face corrosion resistance is deteriorated. If it is greater than 56%, formability and edge face corrosion resistance become worse. A preferred range of this total content is at least 35% and not greater than 52%.

The coating composition according to the present invention may be prepared by mixing the above-described ingredients in a solvent in a conventional manner. The solvent need not be a special one and can be selected from those which are employed in conventional coating compositions for the manufacture of precoated steel sheets. Useful solvents include ketones such as cyclohexanone and isophorone, petroleum solvents such as Solvesso 100 and Solvesso 150, aromatic hydrocarbons such as toluene and xylene, alcohols such as n-butyl alcohol and benzyl alcohol, ethers such as tetrahydrofuran, and water.

The coating composition can be used to produce resin-coated metal sheets having improved overcoat adhesion, weldability (by continuous spot welding), edge face corrosion resistance, and formability. Preferably, the coating composition is applied to a plated metal sheet having a zinc- or aluminum-based plated coating after the plated metal sheet has been subjected to chemical conversion treatment, which is zinc phosphating or chromating treatment or both. The resulting resin-coated metal sheet has three layers: an undermost plated coating, an intermediate chemical treatment coating, and an uppermost resinous coating, on one or both sides of the substrate metal sheet.

A coating composition according to the present invention in which the binder resin is selected from a polyester resin, an epoxy resin, a urethane resin, and an acrylic resin and the curing agent is at least one of an alkyletherified aminoformaldehyde resin and an isocyanate compound is particularly advantageous in that the resulting resin-coated metal sheet having a resinous coating formed therefrom has well-balanced properties with respect to overcoat adhesion, edge face corrosion resistance, formability, and weldability.

Metal Sheet

The type of metal sheet used as a substrate is not critical. Generally the substrate is a steel sheet such as one specified in JIS G3141, e.g., SPCC, SPCD, or SPCE, or a high-tensile strength steel sheet such as a sheet of an ultra-low carbon, Ti-containing steel or a P-containing steel. Metal sheets other than steel sheets, e.g., aluminum sheets, may be used as the substrate.

Plated Coating

The substrate metal sheet has a plated coating on one or both sides thereof to provide corrosion resistance. The plated coating may be a zinc-based coating (including zinc and zinc alloy coatings) or an aluminum-based coating (including aluminum and aluminum alloy coatings).

The plated metal may be selected based on the end use of the resin-coated metal sheet or the location where it is used. Examples of the metal to be plated include Zn metal, Zn—Fe alloys, Zn—Co alloys, Zn—Ni alloys, Zn—Mn alloys, Zn—Cr alloys, Zn—Mg alloys, Zn—Al alloys, Al metal, and Al—Mn alloys. Preferred metals for plating are Zn metal, Zn—Ni alloys, Zn—Co alloys, Zn—Al alloys, and Al metal.

A single layer of plated coating is enough, but two or more layers of plated coating may be formed on the substrate metal sheet. The plating may be performed by electroplating (including fused salt electroplating), hot dip coating, and vapor-phase deposition. In the case of hot dip galvanizing (hot dip Zn plating), the plated metal sheet may be subjected to heat treatment for alloying.

When the plated coating is formed by electroplating in an aqueous plating solution, one or more organic inhibitors may be added to the plating solution in order to improve the corrosion resistance of the resulting plated coating.

Examples of useful organic inhibitors include alkynes such as pentyne, heptyne, and octyne; alkynols such as propargyl alcohol, 1-hexyne-3-ol, and 1-heptyne-3-ol; aliphatic or aromatic amines such as laurylamine, octylamine, propenylamine, cyclohexylamine and their salts such as hydrochlorides, sulfates, and nitrates; thio compounds such as thiourea and its derivatives, decyl mercaptan, and dimethyl sulfide; heterocyclic compounds such as thiophene, indole, benzimidazole, and dextrin; polycarboxylic acids such as citric acid, succinic acid, adipic acid, and sebacic acid and their salts such as sodium salts and potassium salts; aromatic carboxylic acids such as benzoic acid and salycylic acid and their salts such as sodium and potassium salts; lignin sulfonic acid and its salts such as sodium salt; and dextrin.

The organic inhibitor may be added to the plating solution in an amount of from 0.001% to 10% as carbon (as converted into carbon content). If this content is less than 0.001%, the addition of the inhibitor has little effect on corrosion resistance. Addition of the organic inhibitor in an amount of greater than 10% as carbon may result in a loss of the mechanical properties of the resulting plated coating and adversely affect the weldability thereof.

The coating weight of the plated coating is not critical, but it is preferably in the range of at least 10 $g/m^2$ and not greater than 120 $g/m^2$ and more preferably in the range of at least 20 $g/m^2$ and not greater than 100 $g/m^2$ on each side in view of a balance of formability, corrosion resistance, and weldability.

Chemical Treatment Coating Underlying Resinous Coating

Prior to application of the coating composition to form a resinous coating, the plated metal sheet is subjected to chemical conversion treatment in order to improve the adhesion of the resinous coating (to the plated metal sheet) and the corrosion resistance of the resin-coated metal sheet. The chemical conversion treatment may suitably be performed by chromating, zinc phosphating, or a combination of zinc phosphating and chromating.

The chromating treatment may be performed by any of coat-application-type, reaction-type, and electrolytic chromating method. A preferred method is coat-application-type chromating since it gives a chromate coating having improved corrosion resistance. Any class of application-type chromating solution may be used, and it is possible to use a commercially-available partially-reduced chromating solution.

The chromate coating is preferably formed at a weight in the range of at least 10 mg/$M^2$ and not greater than 100 mg/$M^2$ and more preferably in the range of at least 30 mg/$M^2$ and not greater than 80 mg/$m^2$ as converted into the weight of Cr metal. smaller weight of the chromate coating may cause the resinous coating formed thereon to have a decreased adhesion, while a larger weight may adversely affect formability.

The zinc phosphate coating may be formed in a conventional manner, e.g., by spraying or dipping, using a zinc phosphate-containing processing solution conventionally employed for the manufacture of precoat steel sheets. The zinc phosphate coating may preferably be formed at a weight in the range of at least 0.2 g/$m^2$ and not greater than 1.8 g/$m^2$ and more preferably in the range of at least 0.4 g/$m^2$ and not greater than 1.2 g/$m^2$ for the same reason as described for the chromate coating.

Resinous Coating

The coating composition according to the present invention is applied onto the chemical conversion coating to form a resinous coating thereon. The thickness of the resulting resinous coating is preferably in the range of at least 2 $\mu$m and not greater than 9 $\mu$m. A thickness of less than 2 $\mu$m does not provide sufficient improvement in edge face corrosion resistance and formability, while a thickness of greater than 9 pm causes a significant deterioration in weldability. The thickness is more preferably in the range of from 3 $\mu$m to 7 $\mu$m.

The resinous coating may be formed in any appropriate manner. For example, the coating composition may be applied by roll coating, curtain flow coating, or spraying so as to form a thickness as described above, and the wet coating may be dried and cured by heating.

Heating for drying and curing may be performed in a conventional hot-air oven or an induction heating oven. The temperature at which drying and curing occur may be selected based on the particular binder resin, and it is usually from 140° C. to 260° C. as the peak metal temperature (PMT). The duration of heating is normally from 30 seconds to 3 minutes.

The resulting resin-coated metal sheet possesses improved overcoat adhesion, weldability (by continuous spot welding), edge face corrosion resistance, and formability, and is suitable for use as a material for automotive repairing parts.

The topcoat paint suitable for overcoating the resin-coated metal sheet includes acrylic- and urethane-based coating compositions. Even though such topcoat paint may be applied directly to the resin-coated metal sheet without application of an intermediate coating, the resulting topcoat has good adhesion to the resinous coating of the metal sheet. Of course, it is possible to apply the intermediate coating beneath the topcoating.

EXAMPLE 1

Preparation of Coating Compositions

Coating compositions having compositions shown in Table 1 were prepared. In each composition shown in Table 1, the contents of the binder resin (base resin plus curing agent), organic lubricant, and individual pigments are weight percents as solids based on the total solids of the composition, and the content of the curing catalyst is the amount in parts by weight of its effective ingredient present in each 100 parts by weight of the solids of the binder resin (base resin+curing agent), i.e., in PHR.

The binder resins, curing agents, and curing catalysts used are shown in Table 1. Of the binder resins shown therein, the polyester resin was an aqueous (emulsion-type) resin, and the other resins, i.e., urethane resin, urethane-modified epoxy resin, epoxy resin, and polyethersulfone resin, were organic solvent-soluble resins.

The organic lubricant used was Celidust 3620 (a particulate polyethylene wax with particle diameters of 3 to 8 pm, manufactured by Hoechst). The electrically conductive pigment used was Ferrophos HRS 2132 (an iron phosphide-based conductive pigment manufactured by Hooker Chemicals and Plastics), and the other inorganic pigment used was an anticorrosion pigment based on aluminum phosphomolybdate (LF Bousei PM-308 manufactured by Kikuchi Color). The amount of the aluminum phosphomolybdate pigment added was fixed at 5%, and the contents of the conductive pigment, binder resin, and organic lubricant were varied.

Each coating composition was prepared by adding the conductive pigment and the aluminum phosphomolybdate-based pigment to the binder resin in a paint shaker, mixing these ingredients by shaking for 1 hour with glass beads placed in the shaker to disperse the pigments, removing the beads by filtration, and adding the other ingredients including the organic lubricant followed by additional mixing for 10 minutes. The nonvolatile content of the coating composition was adjusted to 50% by adding a solvent (cyclohexanone) as required.

Preparation of Resin-Coated Steel Sheets

A 0.7 mm-thick steel sheet (corresponding to SPCE specified by JIS G 3141) was subjected to Zn—Ni alloy electroplating in an acidic sulfate plating solution to form, on both sides of the sheet, a Zn—Ni alloy plated coating (13% Ni and 87% Zn) with a coating weight of 20 g/$m^2$ for each side. After the plated steel sheet was subjected to alkaline degreasing, rinsed with water, and dried, a commercially available chromating solution (NRC 300 manufactured by Nippon Paint) was applied to the plated surface on each side by a roll coater and dried for 40 seconds in a hot-air oven with the peak metal temperature being 140° C. The chromate coating formed had a weight of 60 mg/$r^2$ as Cr metal.

Each coating composition prepared above was then applied to a dry thickness of 5 $\mu$m by a roll coater onto the chromate coating on each side of the steel sheet and was cured by baking for 1 minute in a hot-air oven with the peak metal temperature being 232° C. to give a resin-coated steel sheet.

Each of the resulting resin-coated steel sheets was evaluated for overcoat adhesion, weldability by continuous spot welding, formability (press formability), and edge face corrosion resistance in the following manner.

[Weldability by Continuous Spot Welding]

Two test pieces of the resin-coated steel sheet (300 mm×300 mm) were placed one over the other and were subjected to continuous spot welding between a pair of electrodes each having a tip diameter of 5 mm under the conditions of a welding force of 250 kg, a weld time of 12 cycles, and a welding current of 8500 A.

The weldability was evaluated by the number of spots which could be formed by continuous spot welding in the following manner, in which ⊚ is a good evaluation.

⊚: 2000 spots or more;
Δ: 1000 spots or more and less than 2000 spots; and
×: Less than 1000 spots.

[Press Formability]

The press formability was evaluated by subjecting a blank of the resin-coated steel sheet having a diameter of 95 mm to deep drawing on a cupping tester with a blank holder pressure of 3 ton, a punch diameter of 50 mm, and a die diameter of 52.4 mm, and performing an adhesive tape-peeling test on the worked area.

The evaluation of press formability was made in the following manner, in which ⊚ indicates a good evaluation.

⊚: No abnormality;
Δ: Deposition of peeled coating on the tape (indicating powdering), but no cracks of the test piece; and
×: Cracks found in the test piece.

[Corrosion Resistance]

(1) Edge Face Corrosion Resistance of Bare Test Piece:

A test piece of the resin-coated steel sheet (150 mm×70 mm) was punched to form a hole having a diameter of 25 mm and a burr height of 0.3 mm and was subjected to an accelerated corrosion test for 20 cycles, each cycle of the test consisting of the following steps:

A Cycle of Accelerated Corrosion Test

Salt spraying (5% NaCl, 35° C., 10 min.)
↓
Drying (60° C., 155 min.)
↓
Wetting (60° C., 95% relative humidity, 75 min.)
↓
Drying (60° C., 160 min.) ←
↓                          | Repeating 5 times
Wetting (60° C., 95% RH, 80 min.) ─┘

At the end of the test period of 20 cycles, the circumferential edge of the hole in the test piece was visually observed to examine the occurrence of normal (red) rust and white rust. The edge face corrosion resistance was evaluated by the fraction of the length along the circumferential edge of the hole which was covered with red or white rust relative to the total circumferential length thereof in the following manner, in which ⊚ indicates a good evaluation.

⊚: Less than 20% of the total circumferential length covered with red or white rust;
Δ: At least 20% and less than 30% thereof covered with red or white rust; and
×: At least 30% thereof covered with red or white rust.

(2) Post-Paint Edge Face Corrosion Resistance:

A test piece of the resin-coated steel sheet (150 mm×70 mm) was punched to form a hole having a diameter of 25 mm and a burr height of 0.3 mm. A two-pack urethane coating composition was then applied to the test piece with the burr down by spray coating to a dry thickness of 40 μm and baked for an hour at 60° C. The overcoated test piece was subjected to the above-described accelerated corrosion test for 30 cycles.

At the end of the test period of 30 cycles having the same steps as above, the circumferential edge of the hole in the test piece was visually observed to examine for the occurrence of red rust and white rust. The edge face corrosion resistance was evaluated in the same manner as above, in which ⊚ indicates a good evaluation.

[Overcoat Adhesion]

A test piece of the resin-coated steel sheet (150 mm×100 mm) was directly spray-coated with a two-pack urethane coating composition for topcoating to a dry thickness of 40 μm and baked for 40 minutes at 60° C. The following three top coating compositions, all of which are of two-pack urethane type, were used:

Topcoat (1): Milan 2K manufactured by Isamu Paint,
Topcoat (2): Rethan PG80 manufactured by Kansai Paint, and
Topcoat (3): Nacks Superio manufactured by Nippon Paint.

Each overcoated test piece was subjected to a cross-cut test with 100 sections measuring 2 mm-square to evaluate the overcoat adhesion by adhesive tape peeling in the following manner, in which ⊚ indicates a good evaluation.

⊚: None of the coating sections peeled off;
Δ: Part of the coating sections peeled off;
×: All the coating sections peeled off.

The test results are shown in Table 2.

Table 2 also shows the storage stability of each coating composition, which was evaluated by allowing the coating composition to stand for 30 days at 50° C. and determining the viscosity of the composition before and after the storage with a Ford cup No. 4. The ratio of the viscosity after the storage to that before the storage was calculated and evaluated in the following manner.

⊚: 1.2 or less of the viscosity ratio;
Δ: more than 1.2 and up to 1.5 of the viscosity ratio;
×: more than 1.5 of the ratio.

Figure 2:
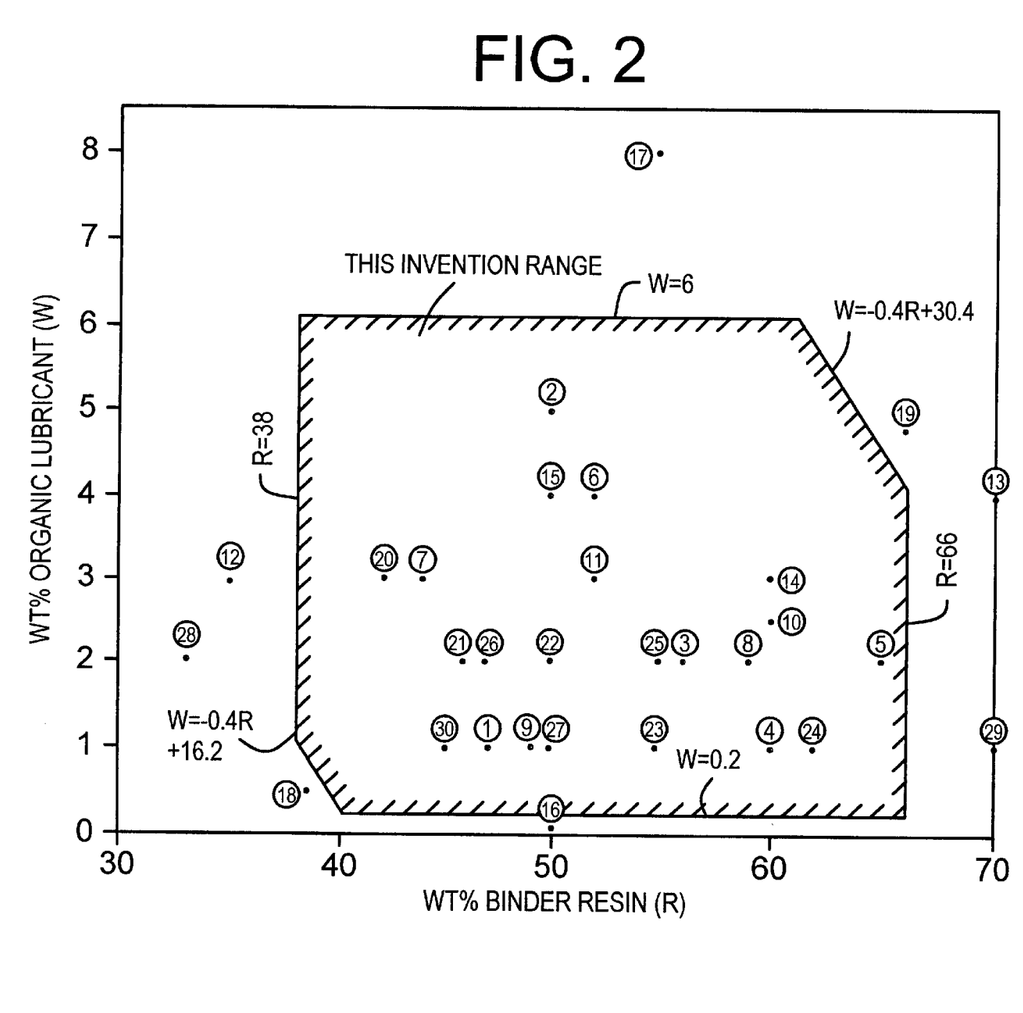
FIG. 2 is a diagram showing the contents of the binder resin and organic lubricant in the coating compositions used in the examples for evaluation by various tests.

The encircled figures shown in FIG. 2 correspond to the encircled figures shown in the column of Table 1 under the heading "Position in FIG. 2".

TABLE 1

| | No. | Binder Resin Base Resin | Binder Resin Curing Agent | Binder Resin % | Curing Catalyst Abbr. | Curing Catalyst PHR | % Organic Lubri-cant | Position in FIG. 2 | % Conductive Pigment | % Inorganic Pigment | % Total Pigment |
|---|---|---|---|---|---|---|---|---|---|---|---|
| THIS INVENTION | 1 | EP | HMDI | 47 | DBTDL | 2 | 1 | ① | 47 | 5 | 52 |
| | 2 | PE | MeM | 50 | PTSA | 3 | 5 | ② | 40 | 5 | 45 |
| | 3 | UM-EP | MDI | 56 | DBTDL | 4 | 2 | ③ | 37 | 5 | 42 |
| | 4 | EP | IPDI | 60 | DBTDL | 8 | 1 | ④ | 34 | 5 | 39 |
| | 5 | PE | MeM | 65 | PTSA | 1 | 2 | ⑤ | 28 | 5 | 33 |
| | 6 | UM-EP | MeM | 52 | PTSA | 2 | 4 | ⑥ | 39 | 5 | 44 |
| | 7 | EP | BuM | 44 | PTSA | 1 | 3 | ⑦ | 48 | 5 | 53 |
| | 8 | PE | MeM | 59 | PTSA | 2 | 2 | ⑧ | 34 | 5 | 39 |
| | 9 | U | BuM | 49 | PTSA | 1 | 1 | ⑨ | 45 | 5 | 50 |
| | 10 | UM-EP | IPDI | 60 | DBTDL | 3 | 2.5 | ⑩ | 32.5 | 5 | 37.5 |
| | 11 | " | MDI | 47 | DBTDL | 0.7 | 1 | ① | 47 | 5 | 52 |
| | 12 | " | " | " | " | 1.5 | " | " | " | " | " |
| | 13 | " | " | " | " | 2.1 | " | " | " | " | " |
| | 14 | " | " | " | " | 7.0 | " | " | " | " | " |
| | 15 | " | " | " | " | 8.2 | " | " | " | " | " |
| | 16 | " | " | " | " | 9.8 | " | " | " | " | " |
| COMPARATIVE | 17 | EP | MDI | 35* | DBTDL | 2 | 3 | ⑫ | 60* | 5 | 65* |
| | 18 | PE | MeM | 70* | PTSAL | 4 | 4 | ⑬ | 21 | 5 | 26* |
| | 19 | U | MeM | 60 | PTSA | 0.3* | 3 | ⑭ | 32 | 5 | 37 |
| | 20 | UM-EP | MeM | 50 | PTSA | 12* | 4 | ⑮ | 41 | 5 | 46 |
| | 21 | UM-EP | IPDI | 50 | DBTDL | 2 | 0.1* | ⑯ | 44.9 | 5 | 49.9 |
| | 22 | EP | MDI | 55 | DBTDL | 2 | 8* | ⑰ | 32 | 5 | 37 |
| | 23 | UM-EP | HMDI | 38.5 | " | 3 | 0.5 | ⑱ | 48 | 13 | 61* |
| | 24 | " | " | 65 | " | 4 | 5 | ⑲ | 25 | 5 | 30* |
| | 25 | " | MDI | 47 | " | 12.3* | 1 | ① | 47 | 5 | 52 |
| | 26 | " | " | " | " | 0* | " | " | " | " | " |

(Note) Base Resin: EP = Epoxy resin, PE = Polyester resin, U = Urethane resin, UM-EP = Urethane-modified epoxy resin;
Curing Agent: MeM = Methylated melamine, BuM = Butylated melamine, HMDI = Hexamethylene diisocyanate, MDI = Diphenylmethane diisocyanate, IPDI = Isophorone diisocyanate;
Curing Catalyst: DBTDL = Dibutyltin dilaurate, PTSA = Para-toluenesulfonic acid
*:outside the range defined herein

TABLE 2

| | No. | Overcoat Adhesion Paint ① | Overcoat Adhesion Paint ② | Overcoat Adhesion Paint ③ | Weldability | Press Formability | Edge Face Corrosion Resistance Bare | Edge Face Corrosion Resistance Post-paint | Storage Stability |
|---|---|---|---|---|---|---|---|---|---|
| THIS INVENTION | 1 | ⊙ | ⊙ | ⊙ | ⊙ | ⊙ | ⊙ | ⊙ | ⊙ |
| | 2 | ⊙ | ⊙ | ⊙ | ⊙ | ⊙ | ⊙ | ⊙ | ⊙ |
| | 3 | ⊙ | ⊙ | ⊙ | ⊙ | ⊙ | ⊙ | ⊙ | ⊙ |
| | 4 | ⊙ | ⊙ | ⊙ | ⊙ | ⊙ | ⊙ | ⊙ | ⊙ |
| | 5 | ⊙ | ⊙ | ⊙ | ⊙ | ⊙ | ⊙ | ⊙ | ⊙ |
| | 6 | ⊙ | ⊙ | ⊙ | ⊙ | ⊙ | ⊙ | ⊙ | ⊙ |
| | 7 | ⊙ | ⊙ | ⊙ | ⊙ | ⊙ | ⊙ | ⊙ | ⊙ |
| | 8 | ⊙ | ⊙ | ⊙ | ⊙ | ⊙ | ⊙ | ⊙ | ⊙ |
| | 9 | ⊙ | ⊙ | ⊙ | ⊙ | ⊙ | ⊙ | ⊙ | ⊙ |
| | 10 | ⊙ | ⊙ | ⊙ | ⊙ | ⊙ | ⊙ | ⊙ | ⊙ |
| | 11 | Δ | ⊙ | Δ | ⊙ | ⊙ | ⊙ | ⊙ | ⊙ |
| | 12 | ⊙ | ⊙ | Δ | ⊙ | ⊙ | ⊙ | ⊙ | ⊙ |
| | 13 | ⊙ | ⊙ | ⊙ | ⊙ | ⊙ | ⊙ | ⊙ | ⊙ |
| | 14 | ⊙ | ⊙ | ⊙ | ⊙ | ⊙ | ⊙ | ⊙ | ⊙ |
| | 15 | ⊙ | ⊙ | ⊙ | ⊙ | ⊙ | ⊙ | ⊙ | ⊙ |
| | 16 | ⊙ | ⊙ | ⊙ | ⊙ | ⊙ | ⊙ | ⊙ | Δ |
| COMPARATIVE | 17 | X | ⊙ | Δ | ⊙ | X Crack | X | X | ⊙ |
| | 18 | ⊙ | ⊙ | ⊙ | X | ⊙ | ⊙ | ⊙ | ⊙ |
| | 19 | X | Δ | X | ⊙ | ⊙ | ⊙ | Δ | ⊙ |
| | 20 | ⊙ | ⊙ | ⊙ | Δ | X Crack | ⊙ | ⊙ | X |
| | 21 | ⊙ | ⊙ | ⊙ | ⊙ | X Crack | ⊙ | ⊙ | ⊙ |
| | 22 | X | Δ | Δ | ⊙ | X Crack | ⊙ | ⊙ | ⊙ |
| | 23 | Δ | Δ | X | ⊙ | X Crack | X | X | ⊙ |
| | 24 | ⊙ | Δ | Δ | Δ | X Crack | ⊙ | ⊙ | ⊙ |
| | 25 | ⊙ | ⊙ | ⊙ | ⊙ | ⊙ | ⊙ | ⊙ | X |
| | 26 | X | X | X | ⊙ | ⊙ | ⊙ | ⊙ | ⊙ |

As apparent from the results shown in Table 2, the resin-coated steel sheets prepared from a coating composition according to the present invention were improved in all the properties of overcoat adhesion, weldability, formability, and edge face corrosion resistance. On the other hand, at least one of these properties was deteriorated in the resin-coated steel sheets prepared from a comparative coating composition.

EXAMPLE 2

Preparation of Coating Compositions

Coating compositions having a composition shown in Table 3 were prepared in the same manner as described in Example 1. In each composition, the contents of the binder resin (base resin plus curing agent), organic lubricant, and individual pigments are weight percents as solids based on the total solids of the composition, and the content of the curing catalyst (as its effective amount) is PHR based on the solids of the binder resin (base resin+curing agent).

The binder resin (base resin and curing agent) used consisted of a urethane-modified epoxy resin as a base resin and diphenylmethane diisocyanate as a curing agent. As a curing catalyst, dibutyltin dilaurate (DBTDL) was used. The organic lubricant and conductive pigment were the same as used in Example 1, i.e., Celidust 3620 and Ferrophos HRS 2132, respectively. The amounts of these ingredients were varied as shown in Table 3.

As the other inorganic pigments, in addition to the same aluminum phosphomolybdate-based anticorrosive pigment as used in Example 1, one or more pigments selected from silica (Aerosil 130 manufactured by Nippon Aerosil), a titanium oxide pigment (Tipaque CR95 manufactured by Ishihara Sangyo), and chromate-type anticorrosive pigments (strontium chromate, zinc chromate, and barium chromate, all manufactured by Kikuchi Color) were used.

Preparation of Resin-Coated Steel Sheets

A 0.7 mm-thick steel sheet (corresponding to SPCE specified by JIS G 3141) was subjected to hot dip galvanizing to form a zinc plated coating (containing 0.3% Fe, 0.2% Al, and 30 ppm Pb) on both sides of the sheet with a coating weight of 60 g/m² for each side. After the plated steel sheet was rinsed with water and dried, a commercially available chromating solution (Zinchrome R1415A manufactured by Nippon Parkerizing) was applied to the plated surface on each side by a roll coater and dried for 25 seconds in a hot-air oven with the peak metal temperature being 140° C. The chromate coating formed had a weight of 50 mg/m² as Cr metal.

Each coating composition prepared in the above manner was then applied to a dry thickness in the range of 1–10 μm by a roll coater onto the chromate coating on each side of the steel sheet and was cured by baking for 1 minute in a hot-air oven with a peak metal temperature of 232° C. to give a resin-coated steel sheet.

Each of the resulting resin-coated steel sheets was evaluated for overcoat adhesion, weldability by continuous spot welding, formability, and edge face corrosion resistance in the same manner as described in Example 1. Furthermore, its resistance to chromium elution was evaluated in the following manner.

[Resistance to Chromium Elution]

A test piece of the resin-coated steel sheet (100 mm×100 mm) was immersed in 100 ml of deionized water at 20° C. for 24 hours. The concentration of hexavalent chromium ions in the deionized water after immersion was then determined by absorption spectrophotometry to evaluate the degree of chromium elution in the following manner.

"Low" : less than 1.0 mg/l/m² $Cr^{6+}$ concentration,

"High": 1.0 mg/l/m² $Cr^{6+}$ or higher concentration.

The test results are shown in Table 4. As apparent from the results shown in Table 4, those resin-coated steel sheets prepared from a coating composition according to the present invention were improved in all the properties of overcoat adhesion, weldability, formability, and edge face corrosion resistance. On the other hand, at least one of these properties was deteriorated in those resin-coated steel sheets prepared from a comparative coating composition.

TABLE 3

| | No. | Binder Resin | Curing Catalyst (PHR) | % Lubricant | % Conductive Pigment | Position in FIG. 2 | Other Inorganic Pigment (%) Anti-Corrosive | | Body | | Total % | Total Pigment % |
|---|---|---|---|---|---|---|---|---|---|---|---|---|
| THIS INVENTION | 27 | 42 | 2 | 3 | 32 | ⑳ | PMo | 15 | TiO | 5 | 23 | 55 |
| | | | | | | | | | SiO | 3 | | |
| | 28 | 46 | 1 | 2 | 38 | ㉑ | PMo | 12 | TiO | 2 | 14 | 52 |
| | 29 | 50 | 4 | 2 | 40 | ㉒ | SCr | 1 | TiO | 2 | 8 | 48 |
| | | | | | | | | | SiO | 5 | | |
| | 30 | 56 | 3 | | 30 | ㉓ | SCr | 4 | TiO | 8 | 13 | 43 |
| | | | | | | | | | SiO | 1 | | |
| | 31 | 62 | 4 | | 25 | ㉔ | PMo | 8 | TiO | 4 | 12 | 37 |
| | 32 | 55 | 2 | 2 | 35 | ㉕ | PMo | 6 | SiO | 1 | 8 | 43 |
| | | | | | | | SCr | 1 | | | | |
| | 33 | 47 | 4 | 2 | 35 | ㉖ | PMo | 11 | SiO | 1 | 16 | 51 |
| | | | | | | | SCr | 4 | | | | |
| | 34 | 50 | 4 | 2 | 40 | ㉒ | ZCr | 1 | TiO | 2 | 8 | 48 |
| | | | | | | | | | SiO | 5 | | |
| | 35 | 56 | 3 | 1 | 30 | ㉓ | ZCr | 4 | TiO | 8 | 13 | 43 |
| | | | | | | | | | SiO | 1 | | |
| | 36 | 56 | 3 | 1 | 30 | ㉓ | BCr | 8 | TiO | 4 | 13 | 43 |
| | | | | | | | | | SiO | 1 | | |

TABLE 3-continued

|  | No. | Binder Resin | Curing Catalyst (PHR) | % Lubricant | % Conductive Pigment | Position in FIG. 2 | Other Inorganic Pigment (%) Anti-Corrosive | | Body | | Total % | Total Pigment % |
|---|---|---|---|---|---|---|---|---|---|---|---|---|
|  | 37 | 50 | 2 | 1 | 35 | ㉗ | SCr | 12 | SiO | 1 | 14 | 49 |
|  |  |  |  |  |  |  | PMo | 1 |  |  |  |  |
| COMPARATIVE | 38 | 33* | 2 | 2 | 18 | ㉘ | PMo | 27 | TiO | 15 | 47 | 65* |
|  |  |  |  |  |  |  | SCr | 5 |  |  |  |  |
|  | 39 | 70* | 2 | 1 | 26 | ㉙ | PMo | 3 | — | 3 | 29 | 29* |
|  | 40 | 45 | 2 | 1 | 53* | ㉚ | SCr | 1 | — | — | 1 | 54 |
|  | 41 | 23* | 2 | 13* | 50 | — | SCr | 10 | TiO | 2 | 14 | 64* |
|  |  |  |  |  |  |  |  |  | SiO | 2 |  |  |

(Note) Anticorrosive Pigment: PMO = Aluminum phosphomolybdate-based pigment, SCr = Strontium chromate, ZCr = Zinc chromate, BCr = Barium chromate;
Body Pigment: SiO = Silica, TiO = Titanium oxide.
*Outside the range defined herein

TABLE 4

|  | No. | Coating Thickness (μm) | Overcoat Adhesion[1] ① | ② | ③ | Weldability | Press Formability | Edge Face Corrosion Resistance Bare | Post-paint | Storage Stability | Degree of Chromium Elution |
|---|---|---|---|---|---|---|---|---|---|---|---|
| THIS INVENTION | 27 | 5 | ◎ | ◎ | ◎ | ◎ | ◎ | ◎ | ◎ | ◎ | Low |
|  | 28 | 5 | ◎ | ◎ | ◎ | ◎ | ◎ | ◎ | ◎ | ◎ | Low |
|  | 29 | 5 | ◎ | ◎ | ◎ | ◎ | ◎ | ◎ | ◎ | ◎ | Low |
|  | 30 | 2 | ◎ | ◎ | ◎ | ◎ | ◎ | Δ | ◎ | ◎ | Low |
|  |  | 5 | ◎ | ◎ | ◎ | ◎ | ◎ | ◎ | ◎ | ◎ | Low |
|  |  | 9 | ◎ | ◎ | ◎ | ◎ | ◎ | ◎ | ◎ | ◎ | Low |
|  | 31 | 5 | ◎ | ◎ | ◎ | ◎ | ◎ | ◎ | ◎ | ◎ | Low |
|  | 32 | 5 | ◎ | ◎ | ◎ | ◎ | ◎ | ◎ | ◎ | ◎ | Low |
|  | 33 | 5 | ◎ | ◎ | ◎ | ◎ | ◎ | ◎ | ◎ | ◎ | Low |
|  | 34 | 5 | ◎ | ◎ | ◎ | ◎ | ◎ | ◎ | ◎ | ◎ | Low |
|  | 35 | 5 | ◎ | ◎ | ◎ | ◎ | ◎ | ◎ | ◎ | ◎ | Low |
|  | 37 | 5 | ◎ | ◎ | ◎ | ◎ | ◎ | ◎ | ◎ | ◎ | High |
| COMPARTIVE | 30 | 1* | ◎ | ◎ | ◎ | ◎ | X | X | ◎ | ◎ | Low |
|  |  | 10* | ◎ | ◎ | ◎ | X | X Crack | ◎ | ◎ | ◎ | Low |
|  | 38 | 5 | ◎ | ◎ | ◎ | X | X Crack | ◎ | ◎ | ◎ | Low |
|  | 39 | 5 | ◎ | ◎ | ◎ | ◎ | ◎ | X | X | ◎ | Low |
|  | 40 | 5 | ◎ | ◎ | ◎ | ◎ | X Crack | X | Δ | ◎ | Low |
|  | 41 | 5 | X | X | X | ◎ | X Crack | ◎ | ◎ | ◎ | Low |

[1]The encircled numbers 1, 2, 3 indicates the number of coating composition.
*Thickness outside the range defined herein.

EXAMPLE 3

Preparation of Coating Compositions

Coating compositions having a composition shown in Table 5 were prepared in the same manner as described in Example 1. In each composition, the contents of the binder resin (base resin plus curing agent), organic lubricant, and individual pigments were weight percents as solids based on the total solids of the composition, and the content of the curing catalyst (as its effective amount) was PHR based on the solids of the binder resin (base resin+curing agent).

The binder resin (base resin and curing agent) used consisted of the same epoxy resin (base resin) as used in Example 1 and hexamethylene diisocyanate (HDMI) as a curing agent. As a curing catalyst, dibutyltin dilaurate (DBTDL) was used. The organic lubricant and conductive pigment were the same as used in Example 1, i.e., Celidust 3620 and Ferrophos HRS 2132, respectively. The amounts of the binder resin, curing catalyst, and organic lubricant were fixed at 52%, 4 PHR, and 3%, respectively. The relationship between the amounts of the binder resin and the organic lubricant corresponds to the position marked (11) in FIG. 2.

The other inorganic pigments used in this example was one or more non-chromium pigments selected from non-chromium anticorrosive pigments including the same aluminum phosphomolybdate-based anticorrosive pigment as used in Example 1, a zinc phosphate-based anticorrosive pigment (LF Bousei ZP-SB manufactured by Kikuchi Color), and magnesium phosphate/vanadium pentoxide mixture-based pigment (VP Pigment F-121 manufactured by Nippon Paint), and from body pigments including the same silica and titanium oxide as used in Example 2, alumina (MC Clay manufactured by Sanyo Clay Kogyo), kaolin (Kaolin HA manufactured by Sanyo Clay Kogyo) and calcium carbonate (Homocal D manufactured by Shiroishi Calcium).

Preparation of Resin-Coated Steel Sheets

A resin-coated steel sheet was prepared by application of each of the above-described coating compositions and tested in exactly the same manner as described in Example 1. The test results are shown in Table 6.

TABLE 5

|  |  | No. | Binder Resin | Curing Catalyst (PHR) | Lubricant (%) | Conductive Pigment (%) | Other Inorganic Pigment (%) | | | | Total Pigment (%) |
|---|---|---|---|---|---|---|---|---|---|---|---|
|  |  |  |  |  |  |  | Anti-Corrosive | | Body | Total | |
| THIS INVENTION |  | 42 | 52 | 4 | 3 | 34 | — | | SiO 11 | 11 | 45 |
|  |  | 43 | 52 | 4 | 3 | 34 | — | | SiO 6 | 11 | 45 |
|  |  |  |  |  |  |  |  | | AlO 3 |  |  |
|  |  |  |  |  |  |  |  | | KAO 2 |  |  |
|  |  | 44 | 52 | 4 | 3 | 21 | — | | SiO 12 | 24 | 45 |
|  |  |  |  |  |  |  |  | | CaC 12 |  |  |
|  |  | 45 | 52 | 4 | 3 | 20 | PMo | 25 | — | 25 | 45 |
|  |  | 46 | 52 | 4 | 3 | 20 | — | | SiO 15 | 25 | 45 |
|  |  |  |  |  |  |  |  | | TiO 10 |  |  |
|  |  | 47 | 52 | 4 | 3 | 42 | PMo | 1.5 | SiO 1.5 | 3 | 45 |
| COMPAR. |  | 48 | 52 | 4 | 3 | 18* | P/V | 27 | — | 27 | 45 |
|  |  | 49 | 52 | 4 | 3 | 19* | PZn | 10 | — | 26 | 45 |
|  |  |  |  |  |  |  | PMo | 16 |  |  |  |
|  |  | 50 | 52 | 4 | 3 | 44.5 | PMo | 0.5 | — | 0.5* | 45 |

(Note) Anticorrosive Pigment: P/V = Magnesium phosphate/vanadium pentoxide mixture, PZn = Zinc phosphate, PMo = Aluminum phosphomolybdate-based pigment
Other Pigment: SiO = Silica, AlO = Alumina, KAU = Kaolin, CaC = Calcium carbonate, TiO = Titanium oxide.
*Outside the range defined herein

TABLE 6

|  | No. | Overcoat Adhesion | | | Weldability | Press Formability | Edge Face Corrosion Resistance | | Storage Stability |
|---|---|---|---|---|---|---|---|---|---|
|  |  | Paint ① | Paint ② | Paint ③ |  |  | Bare | Post-paint |  |
| THIS INVENTION | 42 | ⊚ | ⊚ | ⊚ | ⊚ | ⊚ | ⊚ | ⊚ | ⊚ |
|  | 43 | ⊚ | ⊚ | ⊚ | ⊚ | ⊚ | ⊚ | ⊚ | ⊚ |
|  | 44 | ⊚ | ⊚ | ⊚ | ⊚ | ⊚ | ⊚ | ⊚ | ⊚ |
|  | 45 | ⊚ | ⊚ | ⊚ | ⊚ | ⊚ | ⊚ | ⊚ | ⊚ |
|  | 46 | ⊚ | ⊚ | ⊚ | ⊚ | ⊚ | ⊚ | ⊚ | ⊚ |
|  | 47 | ⊚ | ⊚ | ⊚ | ⊚ | ⊚ | ⊚ | ⊚ | ⊚ |
| COMPAR. | 48 | ⊚ | ⊚ | ⊚ | X | ⊚ | ⊚ | ⊚ | ⊚ |
|  | 49 | ⊚ | ⊚ | ⊚ | X | ⊚ | ⊚ | ⊚ | ⊚ |
|  | 50 | ⊚ | ⊚ | ⊚ | ⊚ | ⊚ | X | X | ⊚ |

As can be seen from Table 6, even though the inorganic pigments contained no anticorrosive pigment, good corrosion resistance and other properties, which were comparable to those obtained in the cases where the inorganic pigments contained an anticorrosive pigment, could be achieved.

Industrial Applicability

The coating composition according to the present invention can be used to produce resin-coated metal sheets which can be well overcoated with a low-temperature curing top coating composition with good adhesion and which have good weldability by continuous spot welding, edge face corrosion resistance, and formability. Such resin-coated metal sheets are suitable for use as a material for automotive repair parts. They are also suitable for use as a material for those automobile bodies which are assembled by bonding or welding preformed small split sections. Thus, it is possible to use the resin-coated metal sheets in the fabrication of automobile bodies.

What is claimed is:

1. A coating composition comprising the following ingredients in a solvent, on a weight basis as solids content:

at least 38% and not greater than 66% of a binder resin (including a curing agent), at least 0.2% and not greater than 6% of an organic lubricant, at least 20% and not greater than 50% of an iron phosphide-based electrically conductive pigment, and at least 3% and not greater than 25% of one or more inorganic pigments other than the electrically conductive pigment, wherein the sum of the contents of the electrically conductive pigment and one or more inorganic pigments is at least 31% and not greater than 56%, and wherein the contents of the binder resin (including a curing agent) and the organic lubricant satisfy the inequality:

$$0.4R+16.2 \leq W \leq -0.4R+30.4 \tag{1}$$

where

R: content in weight percent of the binder resin (including a curing agents, and W: content in weight percent of the organic lubricant, said coating composition further comprising a curing catalyst in an amount of at least 0.7% and not greater than 10% by weight based on the binder resin (including a curing agent).

2. The coating composition according to claim 1 wherein the one or more inorganic pigments contain a chromate or non-chromium anticorrosive pigment.

3. The coating composition according to claim 1 wherein the one or more inorganic pigments contain a chromate anticorrosive pigment with a content of not greater than 11%.

4. The coating composition according to claim 1 wherein the one or more inorganic pigments are free from an anticorrosive pigment and their content is between 10% and 25%.

5. The coating composition according to claim 1 wherein the binder resin comprises at least one base resin selected from the group consisting of a polyester resin, an epoxy resin, a urethane resin, an acrylic resin, and modified resins thereof, and at least one curing agent selected from the group consisting of an amine, an acid anhydride, and a phenolic resin.

6. The coating composition according to claim 5 wherein the curing agent is selected from the group consisting of an alkyletherified amino-formaldehyde resin and an isocyanate compound.

7. The coating composition according to claim 1 wherein the organic lubricant has an average particle diameter of at least 1 $\mu$m and not greater than 10 $\mu$m.

8. A resin-coated metal sheet comprising a plated metal sheet with a zinc- or aluminum-based plated coating, said resin-coated metal sheet having thereon a lower coating formed by at least one class of chemical conversion treatment selected from the group consisting of zinc phosphate treatment and chromate treatment, and an upper resinous coating formed from the coating composition according to claim 1 having a thickness in the range of from 2 $\mu$m to 9 $\mu$m.

* * * * *

UNITED STATES PATENT AND TRADEMARK OFFICE
CERTIFICATE OF CORRECTION

PATENT NO. : 6,126,730
DATED : October 3, 2000
INVENTOR(S) : Tsutomu YOSHIDA, et al.

It is certified that error appears in the above-identified patent and that said Letters Patent is hereby corrected as shown below:

On the title page:

The following additional Assignee is added:

[73]   Assignee: Nippon Paint Co., Ltd.
       Osaka, Japan

Signed and Sealed this

Eighth Day of May, 2001

Attest:

NICHOLAS P. GODICI

Attesting Officer

Acting Director of the United States Patent and Trademark Office